United States Patent [11] 3,577,017

[72] Inventors Jimmy R. Duke;
 Walter E. Miller, Jr., Huntsville, Ala.
[21] Appl. No. 784,443
[22] Filed Dec. 17, 1968
[45] Patented May 4, 1971
[73] Assignee the United States of America as represented by the Secretary of the Army

[54] RECTANGULAR PULSE MODULATOR
 2 Claims, 6 Drawing Figs.
[52] U.S. Cl. .................................................. 307/284,
 307/268, 307/312, 333/20, 307/108, 331/94.5
[51] Int. Cl. ...................................................... H03k 3/35
[50] Field of Search ........................................... 307/268,
 284, 312, 106, 8; 328/65; 331/94.5, (Inquired);
 333/20

[56] References Cited
UNITED STATES PATENTS
3,181,071 4/1965 Smith et al. ................... 328/65
3,371,232 2/1968 Hannan et al. ................. 307/212
OTHER REFERENCES
 Missles and Rockets June 10, 1963 Vol. 12, No. 23 page 33 " GE Developed Laser System Offers High Pulse Rate" (copy enclosed)
 Electronics, May 31, 1963, " Diode Laser Transmits Audio" (copy enclosed)

Primary Examiner—John S. Heyman
Attorneys—Harry M. Saragovitz, Edward J. Kelly, Herbert Berl and Aubrey J. Dunn ABSTRACT: Discharge of a RLC network is controlled with a silicon-controlled rectifier to provide a rectangular pulse for pulsing GaAs lasers.

PATENTED MAY 4 1971  3,577,017

Jimmy R. Duke
Walter E. Miller, Jr.
INVENTORS.

BY Harry M. Saragovitz
Edward J. Kelly
Herbert Berl
Aubrey J. Dunn

RECTANGULAR PULSE MODULATOR

BACKGROUND OF THE INVENTION

Room temperature GaAs lasers typically require currents of 20 to 150 amperes with durations (pulse width) of 200 nanoseconds or less. One method of achieving these requirements is the discharge of a small, high voltage capacitor through the laser using a silicon-controlled rectifier as the switch. This results in a current having a highly peaked triangular waveform when the capacitor is discharged through a very low impedance, approximately 1 ohm. When discharged through the higher impedances encountered in laser arrays, the waveform is similar in rise time, but exhibits a much slower delay characteristic.

Current driven through a laser below the threshold level not only provides no useable optical output, but serves to heat the laser and raise the threshold level. Thus, it is desirable to drive the laser with a very fast rise time current with essentially a flat top and a sharp cutoff. Rectangular pulses of durations and current levels required are not obtainable with simple solid-state modulators. Normal delay lines provide a rectangular pulse only when discharged into a constant impedance. For this reason, delay lines are not desired for use with lasers since lasers present a varying impedance.

SUMMARY OF THE INVENTION

A silicon-controlled rectifier is used to control the discharge of a parallel combination of capacitors, resistors and inductors to provide a desired pulse of current.

DESCRIPTION OF THE PREFERRED EMBODIMENT

Figure 1:
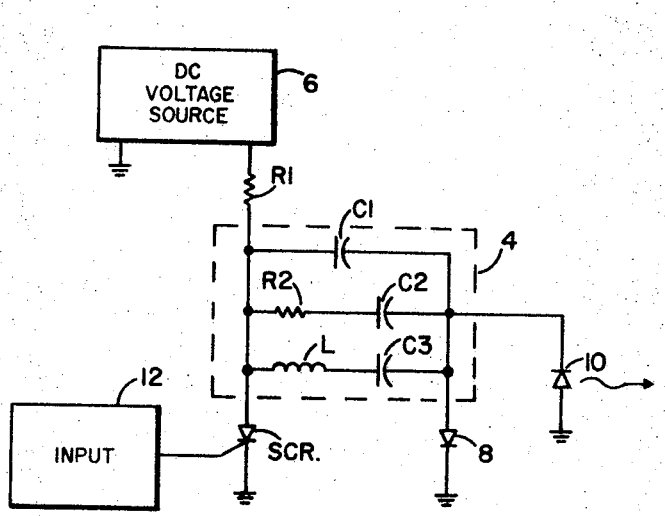
FIG. 1 is a schematic diagram of the present invention.

Referring now to FIG. 1, the silicon-controlled rectifier, SCR, controls the discharge of RLC network 4. The components of RLC network 4 are chosen to approximate a square wave output when they are discharged. During the charge cycle, current flows from voltage supply 6, through RLC network 4 and charging diode 8. When the SCR is keyed ON by the trigger input means 12, RLC network 4 discharges through laser diode 10.

RLC network 4 comprises capacitor C1 in parallel with the series combination of capacitor C2 and resistor R2 and the series combination of capacitor C3 and inductor L. Resistor R1 is chosen to limit the charging current and does not aid in determining the discharge pulses from RLC network 4.

Figure 2:
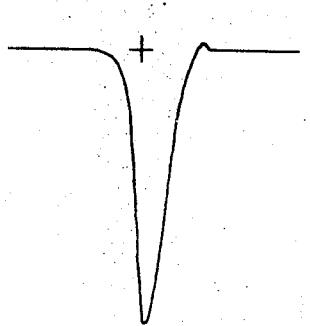
FIGS. 2—6 are current waveforms.
Figure 3:
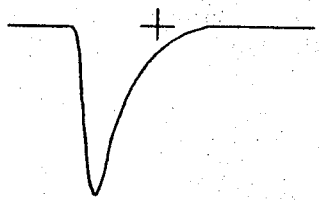
Figure 4:
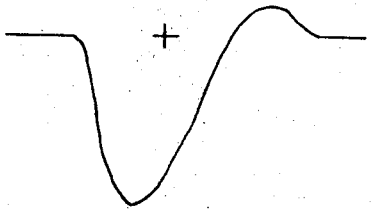
Figure 5:
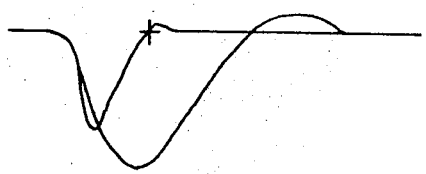

FIG. 2 shows the waveform obtained when a 0.003-microfarad capacitor charged to 800 volts is discharged through a 3-ohm dummy load. FIG. 3 shows the current waveform when a 10-ohm resistor is added in series with the capacitor. The rise time of the pulse is the same as before, but the amplitude is less and the delay time is longer. FIG. 4 shows the current waveform when the 10-ohm resistor is replaced by a 0.5-microhenry inductor. Increased rise time as well as decreased amplitude and increased delay time results. FIG. 5 shows two superimposed waveforms of the type shown in FIGS. 3 and 4, but with such values that when they are triggered by the same SCR, the waveform of FIG. 6 results.

Figure 6:
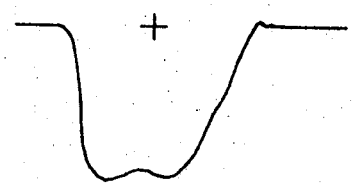

As an example, to obtain an output waveform as shown in FIG. 6, typical values would be:

C1=0.0002 microfarads
C2=0.0015 microfarads
C3=0.0043 microfarads
R2=1.0 ohm
L=0.5 microhenries
R1=100,000 ohms The particular laser diode used presented a 3-ohm load to the RLC network.

We claim:
1. A rectangular pulse modulator comprising: a RLC network having a first, second, and third capacitor, a resistor, and an inductor; a silicon-controlled rectifier having an anode, cathode and trigger input, said cathode being connected to ground; a voltage source connected to a first side of said RLC network and to the anode of said silicon-controlled rectifier; a diode having its anode connected to a second side of said RLC network and its cathode connected to ground; a laser diode having its anode connected to ground and its cathode connected to said second side of said RLC network; and said first capacitor being connected between said first side and said second side of said RLC network, said resistor and said second capacitor being connected in series between said first and second side of said RLC network, said inductor and said third capacitor being connected in series between said first and second side of said RLC network, and said values of said first, second, and third capacitors, said resistor, and said inductor being such that the pulse produced when said RLC network is discharged is essentially a square pulse.

2. A rectangular pulse modulator as set forth in claim 1, further including a trigger input means connected to said trigger input of said silicon-controlled rectifier, said means providing a periodic pulse necessary to key said silicon-controlled rectifier into conduction.